(12) United States Patent
Xue et al.

(10) Patent No.: US 9,124,025 B2
(45) Date of Patent: Sep. 1, 2015

(54) CONNECTOR

(71) Applicant: Tyco Electronics (Shanghai) Co. Ltd., Shanghai (CN)

(72) Inventors: Tim Xue, Shanghai (CN); Jason Yang, Shanghai (CN); Alex Cai, Shanghai (CN); Tommy Yu, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 82 days.

(21) Appl. No.: 14/026,613

(22) Filed: Sep. 13, 2013

(65) Prior Publication Data

US 2014/0080352 A1    Mar. 20, 2014

(51) Int. Cl.
*H01R 13/533*    (2006.01)
*G02B 6/42*    (2006.01)

(52) U.S. Cl.
CPC ............ *H01R 13/533* (2013.01); *G02B 6/4261* (2013.01); *G02B 6/4269* (2013.01)

(58) Field of Classification Search
CPC ........................... G02B 6/4269; H05K 7/20418
See application file for complete search history.

(56) References Cited

U.S. PATENT DOCUMENTS

| | | | | |
|---|---|---|---|---|
| 6,445,583 B1 * | 9/2002 | Kline et al. | | 361/704 |
| 6,749,448 B2 * | 6/2004 | Bright et al. | | 439/160 |
| 6,788,540 B2 * | 9/2004 | Kruger et al. | | 361/719 |
| 6,816,376 B2 * | 11/2004 | Bright et al. | | 361/704 |
| 6,870,746 B2 * | 3/2005 | Leeson et al. | | 361/816 |
| 6,893,293 B2 * | 5/2005 | Ice et al. | | 439/607.2 |
| 6,916,122 B2 * | 7/2005 | Branch et al. | | 385/92 |
| 6,980,437 B2 * | 12/2005 | Bright | | 361/704 |
| 6,992,895 B2 * | 1/2006 | Lindberg | | 361/719 |
| 7,131,859 B1 * | 11/2006 | Zumbrunnen et al. | | 439/487 |
| 7,145,773 B2 * | 12/2006 | Shearman et al. | | 361/715 |
| 7,224,582 B1 * | 5/2007 | Saturley et al. | | 361/679.54 |
| 7,355,857 B2 * | 4/2008 | Pirillis et al. | | 361/715 |
| 7,371,965 B2 * | 5/2008 | Ice | | 174/50 |
| 7,405,931 B2 * | 7/2008 | Saturley et al. | | 361/679.48 |
| 7,457,126 B2 * | 11/2008 | Ahrens | | 361/716 |
| 7,476,108 B2 | 1/2009 | Swain et al. | | |
| 7,539,018 B2 * | 5/2009 | Murr et al. | | 361/704 |
| 7,625,223 B1 * | 12/2009 | Fogg | | 439/92 |
| 7,733,652 B2 * | 6/2010 | Costello et al. | | 361/704 |
| 7,764,504 B2 * | 7/2010 | Phillips et al. | | 361/715 |
| 7,780,361 B2 * | 8/2010 | Harris | | 385/92 |
| 7,859,849 B2 * | 12/2010 | Ice | | 361/715 |

(Continued)

FOREIGN PATENT DOCUMENTS

CN    202749590 U    2/2013
CN    202759716 U    2/2013

OTHER PUBLICATIONS

Abstract of CN202749590, dated Feb. 20, 2013, 1 page.

(Continued)

*Primary Examiner* — Ross Gushi
(74) *Attorney, Agent, or Firm* — Barley Snyder

(57) ABSTRACT

A structurally compact connector that dissipates heat quickly and efficiently is disclosed. The connector includes a housing having a plug receiving space. An elastic member is positioned on the housing, and is displaceable outward from the housing. A protrusion is positioned on an inner surface of the elastic member and extends into the plug receiving space. A thermally conductive element is disposed on an outer surface of the elastic member and is contactable with a heat sink positioned outside of the housing.

21 Claims, 4 Drawing Sheets

(56) References Cited

U.S. PATENT DOCUMENTS

| | | | |
|---|---|---|---|
| 7,898,808 B2* | 3/2011 | Joiner et al. | 361/707 |
| 7,974,098 B2* | 7/2011 | Oki et al. | 361/715 |
| 8,035,973 B2* | 10/2011 | McColloch | 361/709 |
| 8,081,470 B2* | 12/2011 | Oki et al. | 361/715 |
| 8,164,922 B2* | 4/2012 | Kim | 361/801 |
| 8,223,498 B2* | 7/2012 | Lima | 361/720 |
| 8,339,784 B2* | 12/2012 | Pirillis | 361/692 |
| 8,345,445 B2* | 1/2013 | Del Prete et al. | 361/804 |
| 8,358,504 B2* | 1/2013 | McColloch et al. | 361/692 |
| 8,382,509 B2* | 2/2013 | David et al. | 439/487 |
| 8,449,331 B2* | 5/2013 | Phillips et al. | 439/607.21 |
| 8,467,190 B2* | 6/2013 | Yi et al. | 361/704 |
| 8,485,739 B2* | 7/2013 | Yi et al. | 385/92 |
| 8,534,930 B1* | 9/2013 | Lima | 385/92 |
| 8,535,787 B1* | 9/2013 | Lima | 428/195.1 |
| 8,556,658 B2* | 10/2013 | Szczesny et al. | 439/607.2 |
| 8,599,559 B1* | 12/2013 | Morrison et al. | 361/702 |
| 8,670,236 B2* | 3/2014 | Szczesny et al. | 361/704 |
| 8,687,367 B2* | 4/2014 | Gerken et al. | 361/707 |
| 8,817,469 B2* | 8/2014 | Macall | 361/690 |
| 8,830,679 B2* | 9/2014 | Scholeno | 361/711 |
| 8,879,262 B2* | 11/2014 | Shi | 361/704 |
| 8,879,267 B2* | 11/2014 | Henry et al. | 361/715 |
| 8,885,342 B2* | 11/2014 | Skepnek et al. | 361/709 |
| 8,897,016 B2* | 11/2014 | Degner et al. | 361/719 |
| 8,911,244 B2* | 12/2014 | Elison et al. | 439/137 |
| 2002/0131122 A1* | 9/2002 | Anderl et al. | 359/152 |
| 2003/0002824 A1* | 1/2003 | Chan et al. | 385/92 |
| 2003/0141090 A1* | 7/2003 | Kruger et al. | 174/50 |
| 2003/0161108 A1* | 8/2003 | Bright et al. | 361/707 |
| 2003/0169983 A1* | 9/2003 | Branch et al. | 385/92 |
| 2003/0171016 A1* | 9/2003 | Bright et al. | 439/160 |
| 2004/0052998 A1* | 3/2004 | Freuler et al. | 428/40.1 |
| 2004/0085744 A1* | 5/2004 | Leeson et al. | 361/816 |
| 2004/0101257 A1* | 5/2004 | Kruger et al. | 385/92 |
| 2005/0152663 A1* | 7/2005 | Bench et al. | 385/147 |
| 2005/0195571 A1* | 9/2005 | Bulman-Fleming et al. | 361/704 |
| 2005/0220425 A1* | 10/2005 | Kropp et al. | 385/88 |
| 2006/0098924 A1* | 5/2006 | Anderl et al. | 385/92 |
| 2006/0176666 A1* | 8/2006 | Saturley et al. | 361/687 |
| 2006/0270275 A1* | 11/2006 | Morohashi et al. | 439/607 |
| 2006/0281357 A1* | 12/2006 | Chen et al. | 439/350 |
| 2006/0285806 A1* | 12/2006 | Ahrens | 385/92 |
| 2007/0134003 A1* | 6/2007 | Lee et al. | 398/164 |
| 2007/0253168 A1* | 11/2007 | Miller | 361/719 |
| 2007/0272041 A1* | 11/2007 | Bench et al. | 73/865.6 |
| 2008/0019100 A1* | 1/2008 | Yang | 361/716 |
| 2008/0137306 A1* | 6/2008 | Kim | 361/709 |
| 2008/0232067 A1* | 9/2008 | Joiner et al. | 361/707 |
| 2009/0166854 A1* | 7/2009 | Jewram et al. | 257/713 |
| 2009/0253290 A1* | 10/2009 | Harris | 439/377 |
| 2009/0296351 A1* | 12/2009 | Oki et al. | 361/709 |
| 2010/0067196 A1* | 3/2010 | Costello et al. | 361/704 |
| 2011/0051373 A1* | 3/2011 | McColloch | 361/709 |
| 2011/0110044 A1* | 5/2011 | Wei et al. | 361/704 |
| 2011/0110048 A1* | 5/2011 | Lima | 361/720 |
| 2011/0164382 A1* | 7/2011 | Pirillis | 361/690 |
| 2011/0182027 A1* | 7/2011 | Lima et al. | 361/679.46 |
| 2011/0255250 A1 | 10/2011 | Dinh et al. | |
| 2011/0317964 A1* | 12/2011 | Downs | 385/92 |
| 2012/0052720 A1* | 3/2012 | David et al. | 439/487 |
| 2012/0168122 A1* | 7/2012 | Skepnek et al. | 165/80.2 |
| 2013/0033821 A1* | 2/2013 | Szczesny et al. | 361/704 |
| 2013/0077254 A1* | 3/2013 | Nguyen | 361/715 |
| 2014/0080352 A1* | 3/2014 | Xue et al. | 439/487 |
| 2014/0153192 A1* | 6/2014 | Neer et al. | 361/704 |
| 2014/0321061 A1* | 10/2014 | Moore et al. | 361/709 |

OTHER PUBLICATIONS

Abstract of CN202759716, dated Feb. 27, 2013, 1 page.
Machine translation of CN 202749590, dated Feb. 20, 2013, 6 pages.
Machine translation of CN202759716, dated Feb. 27, 2013, 5 pages.

* cited by examiner

CONNECTOR

CROSS-REFERENCE TO RELATED APPLICATIONS

This application claims the benefit of the filing date under 25 U.S.C. §119(a)-(d) of Chinese Patent Application No. 2012103393450, filed Sep. 14, 2012.

FIELD OF THE INVENTION

The present disclosure relates to the field of electronics and particularly to an electrical connector.

BACKGROUND

A transceiver is typically configured to connect a network device such as a switch, a distribution box, a computer input/output port, etc., with an optic fiber or an unshielded twisted pair ("UTP") cable. There is an ongoing trend in transceiver design to decrease the size of the transceiver while increasing the number of available ports. A Small Form Pluggable (SFP) transceiver is an example of a transceiver with a small size and low power consumption configured for an optical communication application in telecommunication or data communication. Moreover, SFP transceivers conform with the SFP+ standard, meaning they also incorporate a signal modulation function, a serializer/de-serializer, clock and data recovery functions and an electronic dispersion compensation function onto a circuit board, without sacrificing their small size and low power consumption.

A connector of a conventional transceiver includes a plug receiving passageway and a plug pluggable into the plug receiving passageway. The plug is commonly an optical transceiver module. The optical transceiver module will generate considerable heat while the connector is in operation. If the generated heat fails to be dissipated in a timely way, the temperate of the connector will rise rapidly, which degrades the quality and reliability of the transceiver.

Conventional transceivers employ a variety of heat dissipation structures to facilitate the removal of the generated heat. For example, a plurality of heat dissipation holes are disposed on a housing having the plug receiving passageway. A fan is positioned in a cabinet where the housing is located, enabling air to flow through the housing to dissipate the generated heat. In another example, a large metal heat sink is positioned on the outside of the housing to increase the available surface area available for heat dissipation.

The problem with these conventional heat dissipation structures is that the fan and metal heat sink occupy considerable space inside the cabinet. Their considerable size prevents their use in applications requiring structurally compact transceivers.

Therefore it is desirable to provide a structurally compact connector that dissipates heat quickly and efficiently.

SUMMARY

In view of foregoing, it is desirable to provide a structurally compact connector that dissipates heat quickly and efficiently.

A structurally compact connector that dissipates heat quickly and efficiently is disclosed. The connector includes a housing having a plug receiving space. An elastic member is positioned on the housing, and is displaceable outward from the housing. A protrusion is positioned on an inner surface of the elastic member and extends into the plug receiving space. A thermally conductive element is disposed on an outer surface of the elastic member and is contactable with a heat sink positioned outside of the housing.

BRIEF DESCRIPTION OF THE DRAWINGS

The invention will now be described by way of example with reference to the accompanying figures, of which.

DETAILED DESCRIPTION

The following detailed description will be given with reference to the drawings. The drawings illustrate a particular embodiment of the invention, by way of an example. The illustrated embodiment is not intended to exhaust all the embodiments of the invention. One of ordinary skill in the art would appreciate that structural or logical modifications can be made in other embodiments without departing from the scope of the invention. Thus the foregoing detailed description is not limiting, and the scope of the invention will be defined by the appended claims.

Figure 1:
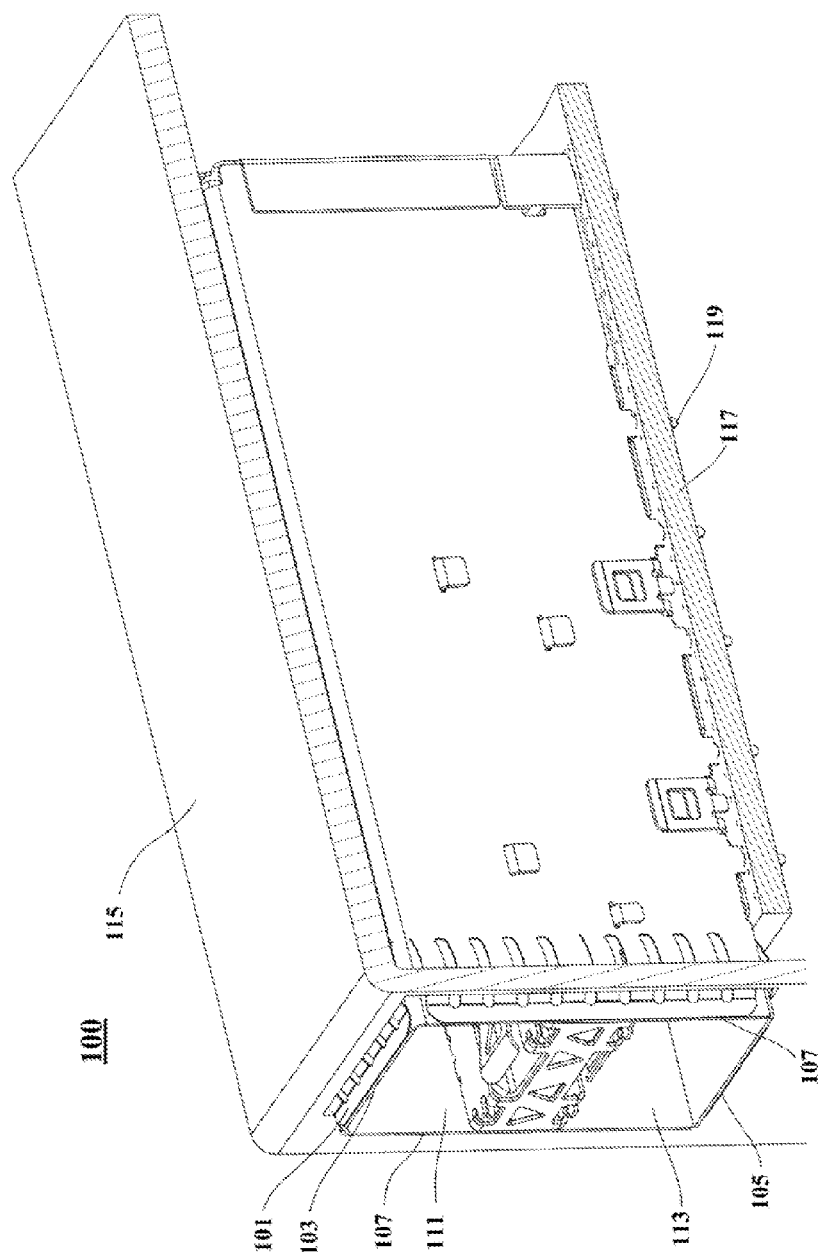
FIG. 1 illustrates a perspective view of a connector.

FIG. 1 illustrates the connector 100 positioned in a connector receiving space (not labeled) in a cabinet housing 115. In a practical application, the cabinet housing 115 is part of a small form pluggable transceiver or other spatially compact electronic device.

The connector 100 includes a housing 101 having a top plate 103, a base plate 105 and two side plates 107 opposite to each other and positioned between the top plate 103 and the base plate 105. A longitudinal top edge of each of the side plates 107 connect to opposing longitudinal edges of the top plate 103, and a longitudinal base edge of each of the side plates 107 connect to opposing longitudinal edges of the base plate 105 to form a plug receiving space constructed to receive an electronic module plug (not illustrated; hereinafter referred to as a "plug").

The top plate 103 includes a elastic member 121 having a protruding portion that protrudes inward from an inner surface of the elastic member 121 into a first plug receiving space 111. A thermally conductive member 129 is disposed on an outer surface of the elastic member 121. See FIGS. 2 and 4.

The base plate 105 includes a elastic member 121 having a protruding portion that protrudes inward from an inner surface of the elastic member 121 into a second plug receiving space 113. A thermally conductive member 129 is disposed on an outer surface of the elastic member 121. See FIGS. 3 and 4.

The inward protrusion of the elastic member 121 permits contact with the plug when the plug is inserted into the plug receiving space 111,113, such that the elastic member 121 is displaced outward from the plug receiving space 111,113. The thermally conductive member 129 is also displaced outward and makes contact with an adjacent heat sink.

In the embodiment illustrated in FIG. 1, the heat sink includes a cabinet housing 115 or a printed circuit board 117. The cabinet housing 115 receives the housing 101 and the printed circuit board 117. A thermally conductive foil is disposed on an inner surface of the cabinet housing 115 adjacent to the top plate 103 of the housing 101. When the plug is inserted into the plug receiving space 111, the thermally conductive foil contacts the thermally conductive member 129.

In an embodiment, the connector 100 includes one or more plug receiving passageways positioned in the housing 101 to be electrically coupled with the plug. In the embodiment illustrated in FIG. 1, the connector 100 includes two plug receiving passageways: a first plug receiving passageway 111 and a second plug receiving passageway 113. The first plug receiving passageway 111 is positioned along the top plate 103 inside of the housing 101, and the second plug receiving passageway 113 is positioned along the base plate 105 inside of the housing 101. The plug can be plugged into the corresponding first plug receiving passageway 111 or the corresponding second plug receiving passageway 113. Since the first plug receiving passageway 111 and the second plug receiving passageway 113 can independently receive the plug, separate elastic members 121 are arranged respectively on the top plate 103 and the base plate 105.

The two plug receiving passageways 111,113 illustrated in FIG. 1 are merely exemplary, and one of ordinary skill in the art would appreciate that in a practical application, the connector 100 can include one, three, four or more plug receiving passageways, which can be structurally identical or different. Moreover, the top plate 103 or the base plate 105, or a combination thereof, can include the elastic member 121 when the connector 100 includes only one plug receiving passageway.

A plurality of pins 119 extend from the longitudinal base edge of each side plate 107 proximate to the printed circuit board 117. A plurality of pin receiving holes (not illustrated) on the printed circuit board 117 are aligned respectively with the pins 119. Thus, the pins 119 can be positioned in the pin receiving holes, securing the housing 110 to the printed circuit board 117. The printed circuit board 117 and the housing 101 are positioned in the cabinet housing 115. One of ordinary skill in the art would appreciate that the width of the cabinet housing 115 will be larger than the width of the housing 101. The width of the cabinet housing 115 can be made to receive one, two, three or more housings 101 side by side in the connector receiving space.

The cabinet housing 115 is typically made of a metal material with good thermal conductivity and heat dissipation. A thermally conductive foil (not illustrated), such as copper foil or aluminum foil, is disposed on a mounting surface of the printed circuit board 117 proximate to the housing 101. The thermally conductive foil also has good thermal conductivity and heat dissipation. When the plug is inserted into the second plug receiving passageway 113, the plug will contact the inward protrusion the elastic member 121. The elastic member 121 is then displaced outward from the plug receiving space 113, and the thermally conductive member 129 will contact the thermally conductive foil. Heat from the elastic member 121 will then be dissipated from the connector 100 to the printed circuit board through the thermally conductive foil.

The structure of the connector 100 will be further described below in connection with FIGS. 2-4.

Figure 2:
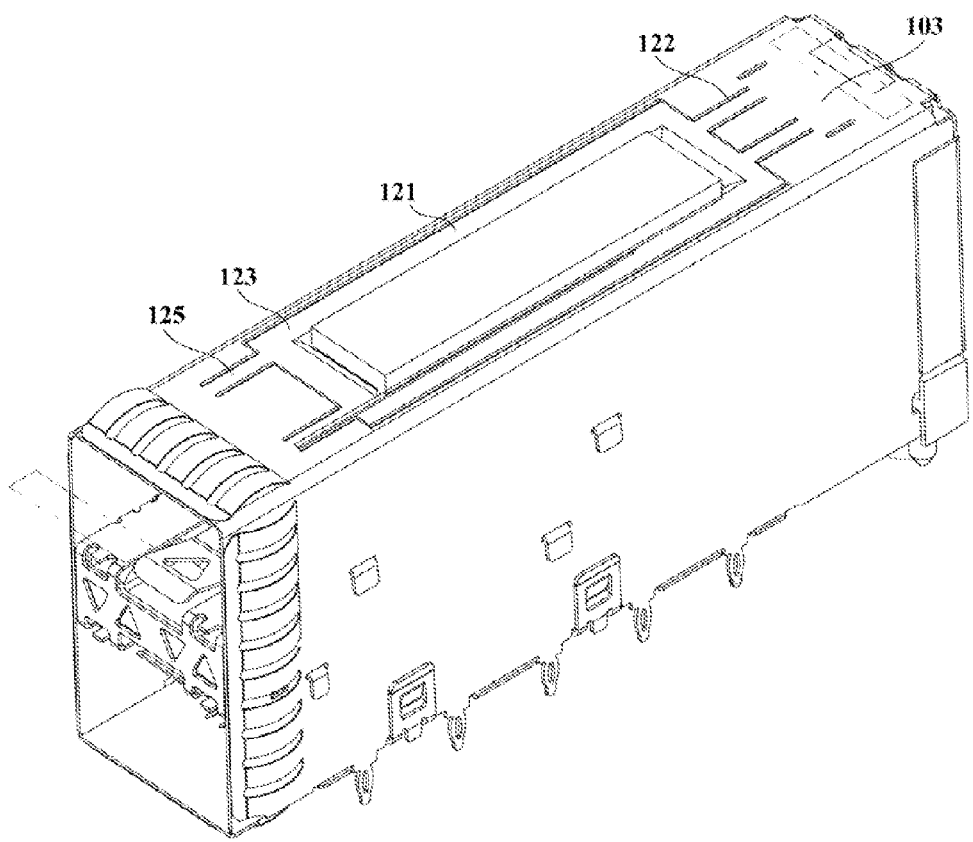
FIG. 2 illustrates a top view of the connector housing.

As illustrated in FIGS. 1 and 2, the top plate 103 is proximate to an inner surface of the cabinet housing 115, and includes an elastic member 121 embedded in the top plate 103. The elastic member 121 has a base 123 and a plurality of resilient connecting arms 125. The base 123 is connected to the top plate 103 through the resilient connecting arms 125. Specifically, the resilient connecting arm 125 is cantilevered, having a fixed end connected to the base 123 and a free end connected to the top plate 103. The resilient connecting arms 125 are positioned on the mating end and distal end of the elastic member 121, and extend from a mating end and a distal end of the elastic member 121. In one embodiment, the elastic member 121 includes two resilient connecting arms 125 positioned on the mating end and two resilient connecting arms 125 positioned on the distal end. In another embodiment, the elastic member 121 has one, three or more resilient connecting arms 125 positioned on the mating end and one, three or more resilient connecting arms 125 positioned on the distal end. A separating space 122 extends along the periphery of the elastic member 121 and separates the elastic member 121 from the top plate 103. The elastic member 121 is positioned at a distance from the inner surface of the cabinet housing 115, and is displaceable outward from the top plate 103 from an initial position by a force perpendicular to the top plate 103. The force acts on the resilient connecting arms 125, and the resilient connecting arms 125 provide an opposing force, such that the elastic member 121 will return to the initial position when the force is removed. In this embodiment, the insertion of the plug into the first plug receiving space 111 provides the outward force perpendicular to the top plate 103. It shall be noted that the resilient connecting arm 125 is a straight resilient connecting arm in the embodiment illustrated in FIG. 2 and FIG. 3, but can alternatively be L-shaped, S-shaped, or another appropriate shape in other embodiments.

Figure 3:
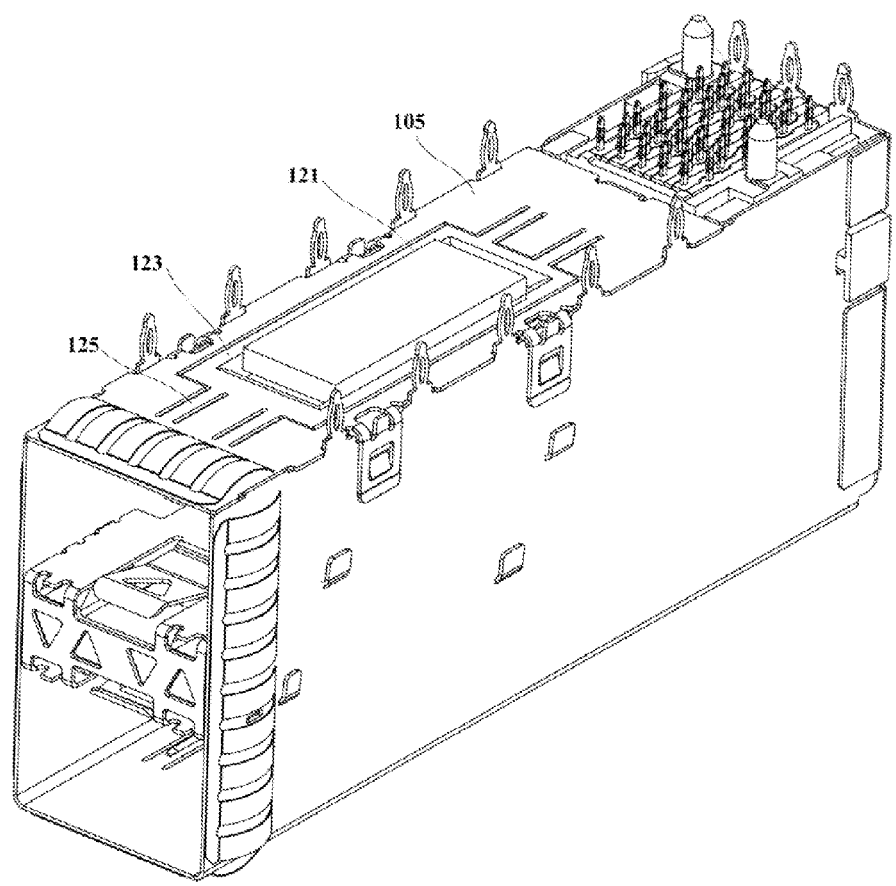
FIG. 3 illustrates a bottom view of the connector housing.

Similarly, the base plate 105 is proximate to the printed circuit board 117, and includes an elastic member 121 embedded in the base plate 105, as shown in FIG. 3. The elastic member 121 has a base 123 and a plurality of resilient connecting arms 125. The base 123 is connected to the base plate 105 through the resilient connecting arms 125. Specifically, the resilient connecting arm 125 is cantilevered, having a fixed end connected to the base 123 and a cantilevered end connected to the base plate 105. The resilient connecting arms 125 are positioned on the mating end and distal end of the elastic member 121, and extend from a mating end and a distal end of the elastic member 121. In one embodiment, the elastic member 121 includes two resilient connecting arms 125 positioned on the mating end and two resilient connecting arms 125 positioned on the distal end. In another embodiment, the elastic member 121 has one, three or more resilient connecting arms 125 positioned on the mating end and one, three or more resilient connecting arms 125 positioned on the distal end. A separating space 122 extends along the periphery of the elastic member 121 and separates the elastic member 121 from the base plate 105. The elastic member 121 is positioned at a distance from the printed circuit board 117, and is displaceable outward from the base plate 105 from an initial position by a force perpendicular to the base plate 105. The force acts on the resilient connecting arms 125, and the resilient connecting arms 125 provide an opposing force, such that the elastic member 121 will return to the initial position when the force is removed. In this embodiment, the insertion of the plug into the second plug receiving space 113 provides the outward force perpendicular to the base plate 105. It shall be noted that the resilient connecting arm 125 is a straight resilient connecting arm in the embodiment illustrated in FIG. 2 and FIG. 3, but can alternatively be L-shaped, S-shaped, or another appropriate shape in other embodiments.

Figure 4:
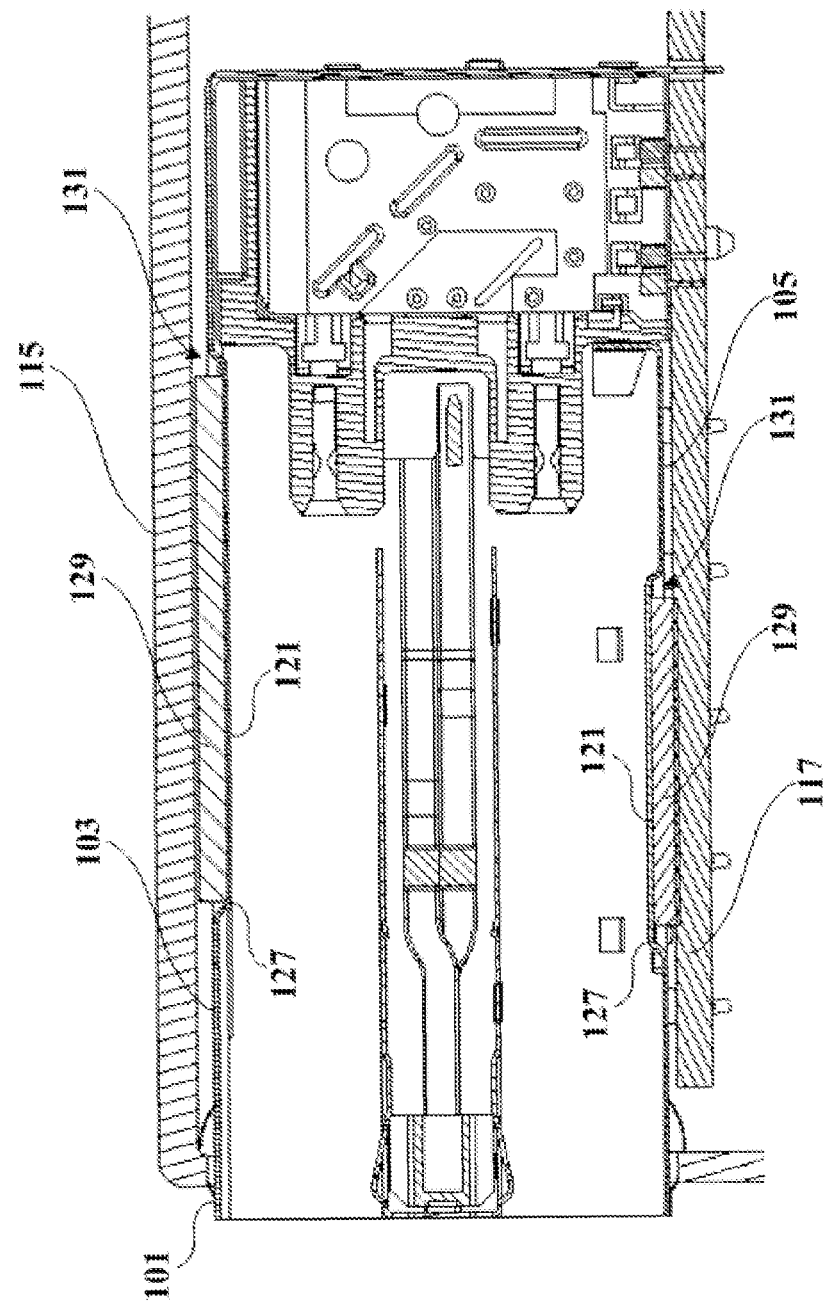
FIG. 4 illustrates a schematic sectional view of the connector.

As illustrated in FIG. 4, the elastic member 121 includes an inner surface having a protrusion 127. The protrusion 127 extends from the inner surface of the top plate 103 or the base plate 105 toward the inside of the housing 101 at a distance away from the top plate 103 or the base plate 105, such that a plug inserted into the plug receiving spaces 111 or 113 will contact the protrusion 127 and apply an outward force on the protrusion 127.

In the embodiments illustrated in FIGS. 2-4, the protrusion 127 is represented as a rectangular bump. However, in other embodiments the protrusion 127 can be made of a plurality of distributed rectangular bumps or a bump in other shapes, such as round, hexagonal, square, or there shapes.

A thermally conductive element 129 is disposed on an outer surface of the elastic member 121. The thermally conductive element 129 is adhered onto the elastic member 121 through an adhesive. When the elastic member 121 is displaced outward by an inserted plug, the thermally conductive element 129 will contact the cabinet housing 115 or the printed circuit board 117. The cabinet housing 115 or the printed circuit board 117 acts as a heat sink. Thus, the thermally conductive element 129 connects the housing 101 together with the cabinet housing 115 or the printed circuit board 117, so that the heat generated by the connector 100 can be dissipated effectively onto the cabinet housing 115 or the printed circuit board 117. The large surface area of the cabinet housing 115 and the printed circuit board 117 provides a larger heat dissipation area than the connector 100 alone.

In an embodiment, without the plug inserted into the plug receiving space 111 or 113, a gap with a predetermined distance may be present between the thermally conductive element 129 and the cabinet housing 115 or the printed circuit board 117. When the plug is inserted into the plug receiving space 111 or 113, the elastic member 121 and the thermally conductive element 129 are displaced outward, across the gap. Correspondingly, the protrusion 127 protrudes inward from the inner surface of the top plate 103 or the base plate 105 at a distance greater than the distance of the gap between the thermally conductive element 129 and the cabinet housing 115 or the printed circuit board 117.

In another embodiment, without the plug inserted into the plug receiving space 111 or 113, the thermally conductive element 129 may abut directly against the cabinet housing 115 or the printed circuit board 117 without a gap. When the plug is inserted into the plug receiving space 111 or 113, the thermally conductive element 129 abuts with greater force against the cabinet housing 115 or the printed circuit board 117.

In an embodiment, the thermally conductive element 129 is made of a plastic material. The plastic material refers to a resilient material that is flexible when an external force is applied. Examples include epoxy resins made of a single component or multiple components or another appropriate compound material. The plastic material is thermally conductive, which can be enhanced by being doped with metal particles. When the plug is inserted into the plug receiving space 111 or 113, the plug contacts the elastic member 121 and deforms the thermally conductive element 129. The deformation increases the contact surface area between the thermally conductive element 129 and the cabinet housing 115 or the printed circuit board 117, increasing the thermal conductivity.

In the embodiments illustrated in FIGS. 2 and 3, the thermally conductive element 129 is constructed as an integral thermally conductive strip. In another embodiment, the thermally conductive element 129 can include a plurality of thermally conductive strips or thermally conductive blocks.

The elastic member 121 also includes a recess 131 on the outer surface, surrounded by the base 123. The thermally conductive element 129 is positioned in the recess 131. The thickness of the thermally conductive element 129 is greater than the depth of the recess 131, such that the thermally conductive element 129 extends outward from the surface of the recess 131, to a distance beyond the outer surface of the top plate 103. The recess 131 permits a thicker thermally conductive element 129 to be employed and fastened. Additionally, the recess 131 prevents excessive deformation of the thermally conductive element 129 by preventing the thermally conductive element 129 from extending from the elastic member onto the non-elastic areas of the top plate 113 or the base 115. In an embodiment, the recess 131 is located on the outer surface of the elastic member 121 and the corresponding protrusion 127 is located on the inner surface of the elastic member 121 to form integrated features. For example, the recess 131 and the protrusion 127 are simultaneously formed through punching. Such a structure is easy to fabricate at a low cost.

The connector 100 in the foregoing embodiments is structurally compact and occupies a small space, while solving the problem of heat dissipation.

Although the invention has been illustrated and described in details in the drawings and the foregoing description, it shall be appreciated that the illustration and the description are exemplary and illustrative but not limiting; and the invention shall not be limited the forgoing embodiments.

Those of ordinary skilled in the art can appreciate and practice other variants to the disclosed embodiments upon review of the description, the disclosure, the drawings and the appended claims. In the claims, the term "comprising" shall not preclude another element or step, and the term "a/an" shall not preclude plural. In a practical application, an element may perform functions of a plurality of technical features recited in the claims. Any reference numerals in the claims shall not be construed as limiting the scope of the invention.

What is claimed is:

1. A connector, comprising:
   a housing having a plug receiving space;
   an elastic member having a base connected to the housing by a resilient connecting arm, and displaceable outward from the housing;
   a protrusion positioned on an inner surface of the elastic member and extending into the plug receiving space; and
   a thermally conductive element disposed on an outer surface of the elastic member and contactable with a heat sink positioned outside of the housing.

2. The connector according to claim 1, wherein the elastic member is disposed on a top plate of the housing.

3. The connector according to claim 1, wherein the elastic member is disposed on a base plate of the housing.

4. The connector according to claim 1, wherein the thermally conductive element is positioned in a recess on the outer surface of the elastic member.

5. The connector according to claim 4, wherein a thickness of the thermally conductive element is greater than a depth of the recess.

6. The connector according to claim 1, wherein the thermally conductive element is a plastic material.

7. The connector according to claim 1, wherein the connector is positioned in a cabinet.

8. The connector according to claim 7, wherein the cabinet is the heat sink.

9. The connector according to claim 1, wherein the housing is connected onto a printed circuit board.

10. The connector according to claim 9, wherein the printed circuit board is the heat sink.

11. The connector according to claim 10, wherein the printed circuit board comprises a thermally conductive foil disposed on a mounting surface proximate to the housing.

12. The connector according to claim 11, wherein the thermally conductive element is contactable with the thermally conductive foil.

13. The connector according to claim 1, wherein the connector further comprises at least two or more plug receiving spaces positioned in the housing.

14. The connector according to claim 1, wherein the connector comprises a first plug receiving space positioned adjacent to a top plate of the housing, and a second plug receiving space, positioned adjacent to a base plate of the housing.

15. A connector, comprising:
   a housing having
      a top plate,
      a bottom plate,
      a first plug receiving space positioned adjacent to the top plate, and
      a second plug receiving space positioned adjacent to the base plate;
   an elastic member positioned on the housing, and displaceable outward from the housing;
   a protrusion positioned on an inner surface of the elastic member and extending into one of the first and second plug receiving spaces; and
   a thermally conductive element disposed on an outer surface of the elastic member and contactable with a heat sink positioned outside of the housing.

16. The connector of claim 15, wherein the elastic member is positioned on the top plate of the housing or the bottom plate of the housing.

17. The connector of claim 16, further comprising two elastic members, one being positioned on the top plate of the housing, and the other being positioned on the bottom plate of the housing.

18. A connector, comprising:
   a housing having a plug receiving space;
   an elastic member positioned on the housing, and displaceable outward from the housing;
   a protrusion positioned on an inner surface of the elastic member and extending into the plug receiving space; and
   a thermally conductive element made of a plastic material disposed on an outer surface of the elastic member and contactable with a heat sink positioned outside of the housing.

19. The connector of claim 18, wherein the housing has a top plate and a bottom plate.

20. The connector of claim 19, wherein the elastic member is positioned on the top plate of the housing or the bottom plate of the housing.

21. The connector of claim 18, further comprising two elastic members, one being positioned on the top plate of the housing, and the other being positioned on the bottom plate of the housing.

* * * * *